F. M. CASE.
DISPENSING DEVICE.
APPLICATION FILED AUG. 16, 1915.

1,244,585.

Patented Oct. 30, 1917.
2 SHEETS—SHEET 1.

Witnesses:
A. L. Lord.
D. Tozer.

Inventor.
Francis M. Case
by B.W. Brockett
Att'y.

F. M. CASE.
DISPENSING DEVICE.
APPLICATION FILED AUG. 16, 1915.

1,244,585.

Patented Oct. 30, 1917.
2 SHEETS—SHEET 2.

UNITED STATES PATENT OFFICE.

FRANCIS M. CASE, OF CLEVELAND, OHIO, ASSIGNOR TO THE RUSS COMPANY, OF CLEVELAND, OHIO, A CORPORATION OF OHIO.

DISPENSING DEVICE.

1,244,585.      Specification of Letters Patent.      Patented Oct. 30, 1917.

Application filed August 16, 1915. Serial No. 45,706.

*To all whom it may concern:*

Be it known that I, FRANCIS M. CASE, citizen of United States, residing at Cleveland, in the county of Cuyahoga and State of Ohio, have invented certain new and useful Improvements in Dispensing Devices, of which the following is a specification.

This invention relates generally to dispensing devices and particularly to apparatus utilized for measuring and delivering predetermined quantities of beverages.

More specifically the invention relates to a dispensing device comprising a main receptacle having a main liquid chamber, provided with a discharge spout, and a communicating supply chamber, having a means for supporting a bottle of liquid in inverted position, so as to deliver to the supply chamber and the main liquid chamber a level of liquid, other means being provided in the form of a displacing member for displacing a quantity of liquid in the main chamber, and thereby causing the discharge of a predetermined quantity from the discharge spout.

The invention may be further briefly summarized as consisting in the construction and combination of parts hereinafter set forth in the following description, drawings and claims.

Figure 1:
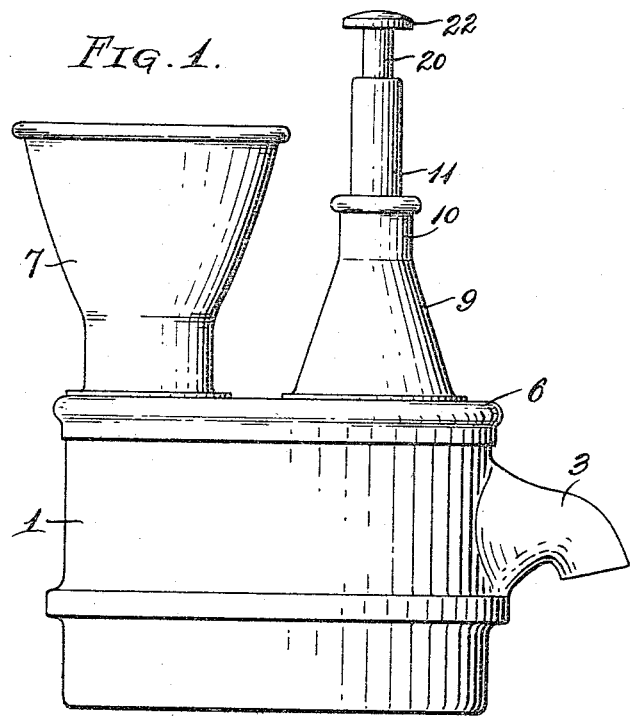
Figure 2:
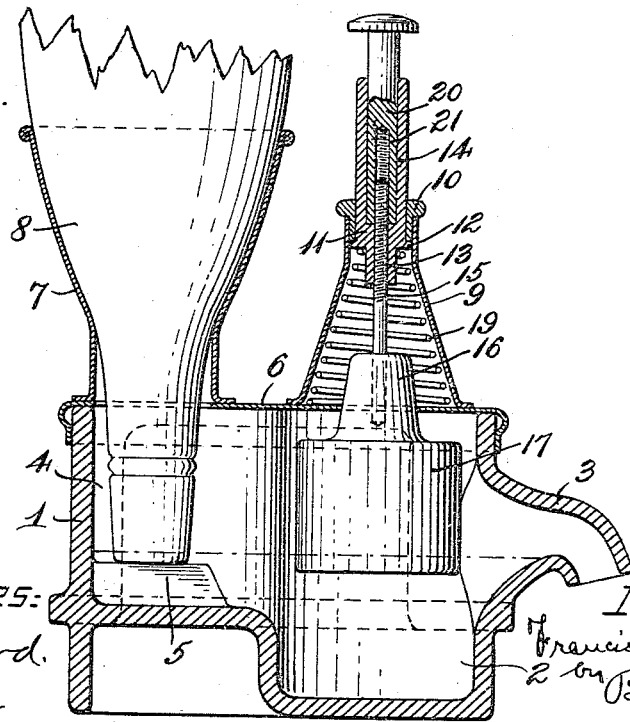
Figure 3:
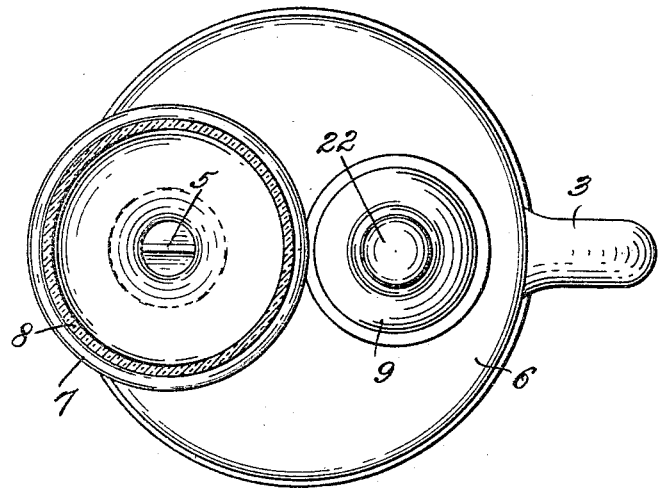
Figure 4:
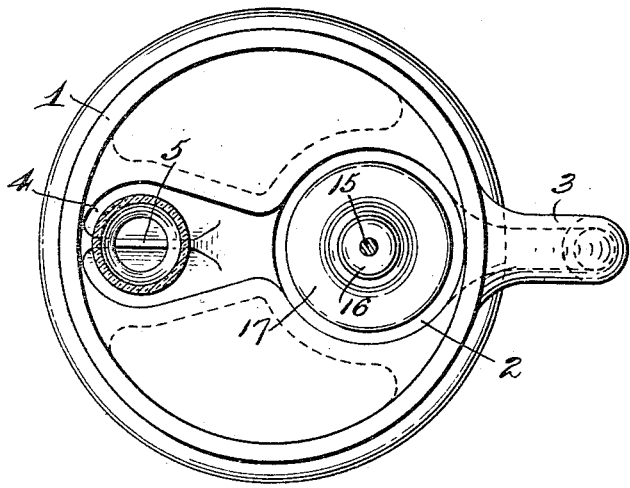

Referring to the drawings, Figure 1 is a side elevation of the device; Fig. 2 is a vertical section; Fig. 3 is a top plan with the bottle shown in section; and Fig. 4 is a similar view with the cover removed and showing the bottle neck in section.

In the embodiment of the invention, set forth in the drawings, 1 represents the main casing provided with a main liquid chamber 2, in communication with an opening in a discharge spout 3, preferably formed integral with the main casing 1. The main casing is further provided with a supply chamber 4, in communication with the main liquid chamber 2. The main casing at the bottom of the supply chamber 4 is provided with an upwardly extending narrow wedge shaped web 5 for a purpose to be described. The main casing is provided with a suitable cover 6, having above the supply chamber 4 a funnel shaped bottle support 7 adapted to receive a bottle 8 when in inverted position, and supporting the same with its mouth in a position to maintain a level of liquid in the supply and main chambers to a point near the bottom of the opening in the spout. The wedge 5 may also serve as a means for supporting the bottle.

Suitable displacement mechanism is arranged on the cover and it comprises a plunger support 9 extending upward from the cover and provided at its upper end with a bearing sleeve 10, receiving a guide and adjusting sleeve 11. This sleeve is provided with a flange 12 at its lower end adapted to engage beneath the bearing sleeve 10 and limit the upward movement of the adjusting sleeve. The adjusting sleeve is further provided with a centrally disposed threaded opening 13 at the lower end and an enlarged opening 14 for a purpose to be described. Engaging in the opening 13 is a threaded rod 15 secured in an extension 16, forming part of a displacement member 17, adapted to move up and down in the main liquid casing and normally assuming an elevated position therein, by reason of the fact that a spring 19 bears upon the top of the casing and against the under side of the flange 12, thus forcing the adjusting sleeve upward against the under side of the bearing sleeve and hence holding the displacement elevated as shown. Within the opening 14 of the adjusting sleeve is a push rod 20, having an internally threaded opening 21 which receives the threaded portion of the rod 15. The upper end of the push rod is preferably provided with a hand piece 22. By the arrangement of the parts at this point the position of the displacement member may be varied by loosening the push rod, screwing the rod 15 into and out of the adjusting sleeve 11, and then turning the push rod so that it will act as a check nut.

In using the device a bottle is inverted into the bottle support 7 and the liquid within the bottle flows into the supply chamber and into the main chamber until the mouth of the bottle is sealed by the liquid in a well known manner, the level of the liquid at this point being slightly below the bottom of the discharge opening in the spout as is indicated by the dotted line in Fig. 2. The user may then draw a charge from the device by pressing the hand piece and thereby causing the connected parts to move down against the spring 19. This operation causes the displacement member 17 to raise the level of the liquid in the casing from whence it will pass out through the spout, the amount of liquid discharged being dependent upon the amount of liquid displacement caused by the displacement member and this displacement may be varied by the adjustment of the displacement member in its supporting mechanism.

Having described my invention I claim:—

1. In a dispensing apparatus, a casing having an outlet, a cover therefor, a bottle support carried by the cover and adapted to support a bottle in inverted position with its mouth at a level below said outlet, and displacement mechanism mounted in the cover and comprising an adjusting sleeve slidably mounted therein, a displacement member, a shank carried thereby and threaded into the adjusting sleeve, a push rod extending into the adjusting sleeve and threaded onto the threaded shank of the displacement member, and a hand piece carried by said push rod.

2. Liquid dispensing apparatus, comprising a hollow casing open at its top and provided with a side outlet, a cover for the top of said casing having means for supporting an inverted bottle with its mouth at a level below said outlet, and a vertically movable displacement device supported in said casing by said cover and operable from the outside thereof, said device being adapted when depressed to cause liquid to overflow through said outlet.

3. Liquid dispensing apparatus, comprising a hollow casing open at its top and provided with a side outlet, a cover for the top of said casing having means for supporting an inverted bottle with its mouth at a level below said outlet, a vertically movable displacement device supported in said casing by said cover and operable from the outside thereof, said device being adapted when depressed to cause liquid to overflow through said outlet, and means for adjusting said displacement device vertically relative to said cover and vary the amount of liquid displaced by a given stroke.

In testimony whereof I affix my signature in presence of two witnesses as follows:

FRANCIS M. CASE.

Witnesses:
G. O. FARQUHARSON,
D. TOZER.

Copies of this patent may be obtained for five cents each, by addressing the "Commissioner of Patents, Washington, D. C."